United States Patent [19]
Wright

[11] 3,874,315
[45] Apr. 1, 1975

[54] SURFACE TREATMENT FOR WATER BORNE VEHICLES

[76] Inventor: Edward Morris Wright, 986 Fifth Ave. Apt. 22, Chula Vista, Calif. 92011

[22] Filed: Sept. 7, 1973

[21] Appl. No.: 395,043

Related U.S. Application Data

[63] Continuation-in-part of Ser. No. 156,710, June 25, 1971, abandoned.

[52] U.S. Cl............ 114/67 A, 9/310 A, 114/66.5 S, 280/11.13 Y
[51] Int. Cl............................................. B63b 1/38
[58] Field of Search........... 114/66.5 S, 67 R, 67 A; 9/310 A; 280/11.13 Y; 115/11, 15

[56] References Cited
UNITED STATES PATENTS

| | | | |
|---|---|---|---|
| 1,894,256 | 1/1933 | Ganahl et al. | 114/67 A |
| 2,914,335 | 11/1959 | Rivard | 9/310 A |
| 2,969,760 | 1/1961 | Eddy | 114/66.5 S |
| 3,316,874 | 5/1967 | Canazzi | 114/67 A |

Primary Examiner—Trygve M. Blix
Assistant Examiner—Jesus D. Sotelo
Attorney, Agent, or Firm—Brown & Martin

[57] ABSTRACT

A surface treatment that is secured over the bottom hull structure of a water borne vehicle and which draws air through numerous ventilated steps to air lubricate ramp portions of the surface treatment and thus reduce viscous drag, suck down, and undesirable trim angle changes. A step and ramp together with longitudinal air carrying channels on either side of the ramp form a cell. The ramp portion of the cell is angulated from the hull bottom structure normal contour at an angle of approximately 4°. Air is drawn from portions of the surface treatment above the instanteous water line or through ventilation ports which penetrate the hull structure.

7 Claims, 5 Drawing Figures

PATENTED APR 1 1975     3,874,315

SURFACE TREATMENT FOR WATER BORNE VEHICLES

RELATION TO OTHER APPLICATIONS

This application is a Continuation-In-Part of applicant's previously filed application, Ser. No. 156,710, filed June 25, 1971 and entitled "Multi-Stepped and Ventilated Bottom for Water Vehicle" now abandoned.

BACKGROUND OF THE INVENTION

Viscous drag resulting from the static water pressure and the movement of the hull outer surface through the water accounts for a substantial part of the total drag even on high speed planing craft. It has been estimated that approximately 50 percent of the drag in planing craft is attributable to viscous friction drag. Various techniques have been proposed for the introduction of air along the hull surface to reduce the viscous drag by air lubricating portions of the hull wetted surface. In some prior art devices, the introduction of air has been by pumping air from the vessel through orifices in the hull. However, in these devices, since no attempt is made to confine the air after it has been pumped out of the hull, and because of the expensive machinery required for the pumping itself, there has been insufficient drag improvement to offset the cost and complexity associated with the device. Similarly in planing hulls, it has been proposed to provide air lubricated surfaces in the immediate vicinity of planing steps or other critical portions of the hull bottom surface. Despite the limited area of their application, these air lubricated steps have necessitated major modification of the hull structure and therefore have not enjoyed widespread usage. In other applications wherein air lubrication has been proposed over a substantial portion of the vehicle wetted surfaces, there has been insufficient attention to the necessity of configuring surface treatment to produce adequate draw of air to lubricate a substantial portion of the ramp between steps.

Therefore it is desirable to have a surface treatment for water borne vehicles which is adaptable for use over existing hull structures and which produces air lubrication over substantially all of the water wetted surfaces of the vehicle. Such a surface treatment is particularly desirable if it is made to be self-supporting on the hull structure, and where it efficiently draws sufficient quantities of air and utilizes the air in an effective manner to reduce suck down and friction drag.

SUMMARY OF THE INVENTION

In an exemplary embodiment of the invention the surface treatment is applied over all of the water wetted surfaces of the vehicle. When used in this connection, "water wetted" refers to those surfaces which are either immersed in normal operation, or periodically immersed in extremes of operation, as in turning, during wave action, and in transition to planing speed. So used, the term includes all of the portions of the hull which are expected to be water wetted in normally encountered operations including the bow portions thereof.

The surface treatment is of a reinforced plastic construction and is configured to correspond to the existing hull contours. The surface treatment is comprised of numerous cells. Each cell includes a ventilated step and a ramp portion, together with longitudinal channels extending lengthwise of the vehicle and forming the sides of the cells. The channels open onto the innermost portion of the surface treatment and provide air communication channels lengthwise of the vehicle to provide for a flow of air from portions of the device above the instanteous water line, as air supply for the steps in the immersed portions. The steps extend substantially perpendicularly from the normal hull contour. The ventilated step has an air hole through its exterior surface. The hole extends into the air chambers formed between the ramps and the bottom hull structure. With forward motion, air is drawn through the hole from the multiple chambers between the surface treatment and the hull bottom structure at any time when the step is immersed in water. The air is drawn by a combination of the negative pressure existing over any hull surface in motion, resulting from the Bernoulli effect produced by the movement of water over the surface and the effect produced by the steps. The air exiting the holes in the ventilated steps is spread over the ramp portion of the cell. Longitudinal channels acting as sidewalls confine the air to the cell and prevent it from moving beamwise to the surface of the water. Thus the vehicle draws sufficient air to obtain a net drag reduction at relatively low speeds. For example, in the tank tests and in the surfboard incorporating the surface treatment of the invention, there has been a noted drag reduction beginning at approximately 12 miles per hour. The proportion of the entire wetted surface which is air lubricated at any particular moment, is enhanced by the use of a ramp angle of approximately 4° or less. This relatively shallow ramp angle spreads the quantity of air available over a substantial longitudinal surface which propagates as the speed increases.

In addition to the drag reduction benefits obtainable with the invention, additional advantages are in the reduction of suck down. Suck down results from the negative pressures over any moving hull surface and is reduced in the instant apparatus by the raising of the pressure due to the introduction of air. The reduction of suck down results in a vehicle which rides higher in the water with less pitch up angle, thus displacing less water and incurring less drag thereby. In the usual vehicle, the suck down is especially evident in the stern because the bow rides up on the bow wave and the stern is pulled down relatively more than the bow, resulting in a pitch up. This pitch up complicates the designers problem in producting a vehicle that rides well at all speeds.

The reduction in suck down in the instant device results in a vehicle which rides flatter at all speeds. Additional benefits of the air cushion accruing to planing hull vehicles, such as speed boats and water skis, are that the air acts as a cushion tending to reduce the impact felt upon encountering waves or in jumping. An additional advantage of a water borne vehicle treated according to the invention, is in the delay of boundary layer separation, together with a reduction in turbulence due to the cushioning and damping effect of the air present. Finally, because the surface treatment of the invention is not structural, it may be made sufficiently light to be flexible and this flexibility enhances the cushioning and damping characteristics of the vehicle to a noticable degree.

It is therefore an object of the invention to provide a new and improved surface treatment for water borne vehicles.

It is another object of this invention to provide a new and improved surface treatment which may be applied to existing hull structures.

It is another object of this invention to provide a new and improved surface treatment which is applicable to all water wetted surfaces of a water borne vehicle.

It is another object of this invention to provide a new and improved surface treatment for water borne vehicles which is self-supporting from the hull structure.

It is another object of this invention to provide a new and improved surface treatment which is relatively light in weight.

It is another object of this invention to provide a new and improved surface treatment which substantially reduces friction drag, suck down, and pitch up.

It is another object of this invention to provide a new and improved surface treatment which is relatively low in cost.

It is another object of this invention to provide a new and improved surface treatment which draws its own air lubrication in sufficient quantities to air lubricate a substantial portion of the water wetted surfaces of a vehicle.

It is another object of this invention to provide a new and improved surface treatment for water borne vehicles with provision for preventing the escape of the lubricating air drawn onto the water wetter surfaces.

It is another object of this invention to provide a new and improved surface treatment for water borne vehicles with reduced air chamber volume.

Other objects and many attendant advantages of the invention will become more apparent upon a reading of the following detailed description together with the drawings, wherein like reference numerals designate like parts throughout and in which.

Figure 1:
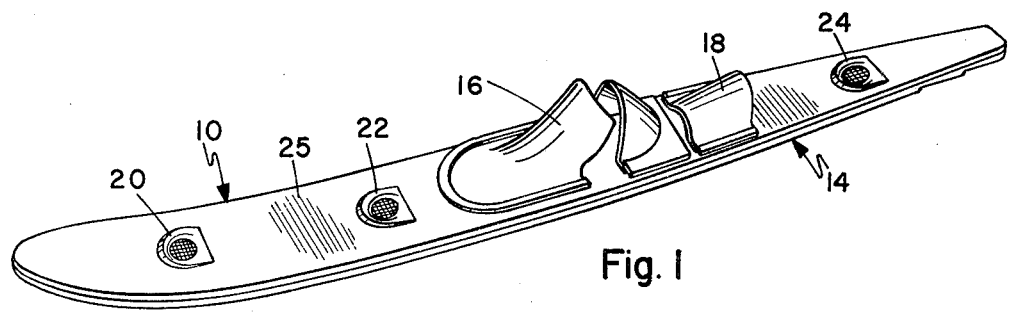
FIG. 1 is a perspective view of a water ski incorporating the surface treatment of the invention.

Referring now to the drawings, there is illustrated a water ski 10. The upper surface of the ski includes conventional foot restraints 16 and 18 together with ventilation ports 20, 22 and 24.

Water ski structure 25 is produced from a composite of structure with a wood core 26 and exterior plastic covering 12 and 47. A surface treatment 14 according to applicant's invention has been secured to the hull structure. All of the normally water wetted portions of the device, including the bow underside, have been covered with surface treatment according to the invention.

Figure 2:
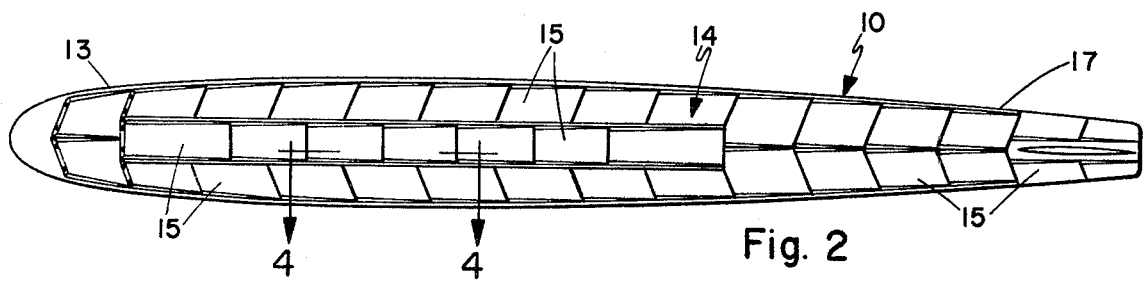
FIG. 2 is a bottom plan view of the ski.
Figure 3:
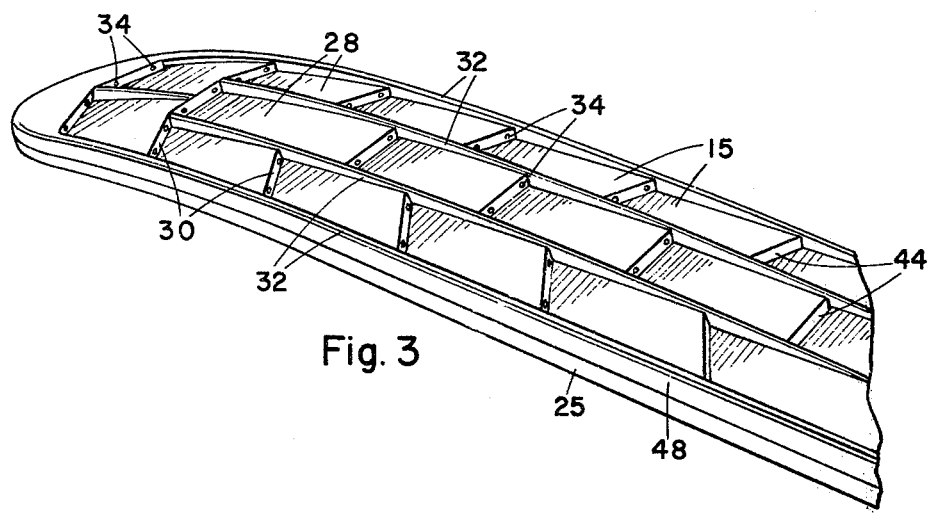
FIG. 3 is an enlarged perspective view of a portion of the ski hull underside.

Referring now particularly to FIG. 2, the surface treatment of the invention is shown to comprise a plurality of individual cells 15. At the maximum beamwise width of the ski 10 the three cells are utilized to cover the width. Whereas at the narrower portions of the device 13 and 17 only two cells are necessary to provide width coverage. All of the cells are approximately twice as long as they are wide, being approximately 2 inches × 4 inches in the instant water ski embodiment. In the portion of the surface treatment 19 with three cell width, the steps in adjacent rows of cells are staggered to avoid excessive bending accross the lines formed by the steps. Referring now to FIG. 3, each cell 15 is shown to comprise a ramp 28, ventilated step portion 30, and sidewalls formed of longitudinal channels 32. The steps 30 have holes 34 penetrating the steps and communicating with the interior of the surface treatment 14. No holes are utilized over that portion of the device illustrated as steps 44, where the normal bow wave would produce a positive pressure tending to flood the interior of the device. It should be noted that it is possible to provide holes in the section in conjunction with a plurality of one-way valves, so that the steps 44 can draw air during that phase of the ski operation where positive pressure does not exist. In any case, any flooding occasioned by instantenous positive pressures over any portion of the device is quickly evacuated by the overall negative pressure produced.

Figure 4:
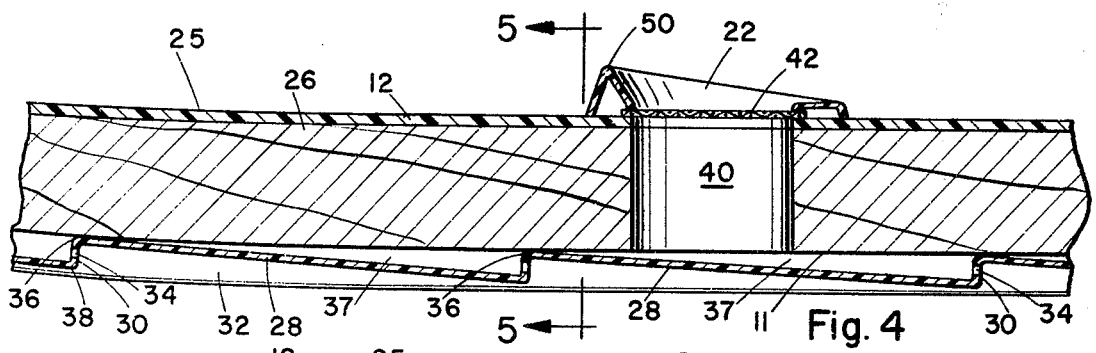
FIG. 4 is an enlarged sectional view taken on line 4—4 of FIG. 2.
Figure 5:
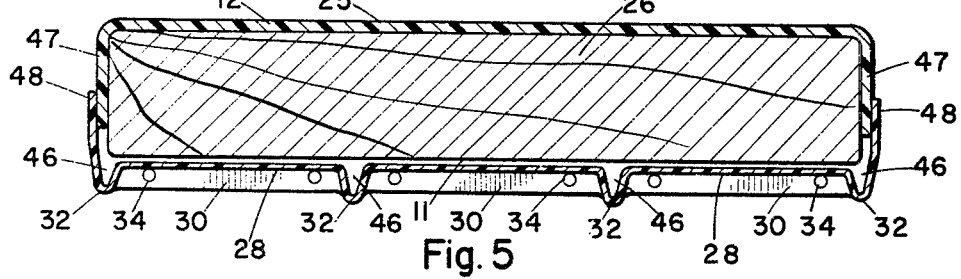
FIG. 5 is a sectional view taken on line 5—5 of FIG. 4.

Referring now to FIGS. 4 and 5, there is illustrated the manner in which the ramps 28 produce a plurality of chambers 37 between the surface treatment 14 and the hull structure surface 11. The innermost portions 36 of the steps 30 contact the hull structure surface 11 and are supported thereby. The ramp 28 angles out from the bottom hull structure surface 11 to be joined with the outermost portion 38 of the adjacent step 30. The relatively resilient reinforced plastic materials employed result in a resiliency for the span of the ramp 28 with effects described more fully hereinafter. The longitudinal channels 32 also provide a plurality of small chambers 46 and additionally permit the various steps to communicate pneumatically with one another for the transfer of air, in certain phases of the operation to be described more fully hereinafter. The sidewall portions 48 of the surface treatment 14 extend over the sidewall portions 47 of the hull structure and may be secured thereto by adhesive bonding or similar means.

Referring again to FIG. 4, the ventilating duct 22 which is also typical of the ventilation ducts 20 and 24 is shown to comprise a bore 40 extending between the upper and lower surfaces of the hull structure and communicating with the chambers between the surface treatment 14 and the hull bottom surface 11. The bore 40 is capped by a screen 42 which excludes foreign material from entering and a fairing 50.

OPERATION

The surface treatment is produced for a particular vehicle application and has the same contours as the water wetted portion of the hull structure. In the case of a conventional hull planing boat, this would include the portions of the hull which are above the normal water line, such as the bow and sides of the vehicle, to the extent that these portions may become wetted during heavy seas or in turns. Other typical applications would include surfboards wherein the entire bottom surface of the board would be treated, and such other water wetted structures associated with water borne vehicles as the water piercing struts of hydrofoils and the keels of captured air bubble craft. In some applications it may not be necessary to provide the ventilation ports as in the preferred embodiment, but rather to permit the structure to draw air from those portions of the surface treatment which are above instanteous water line.

The air is drawn in through the holes 34 and communicated to the submerged portions of the surface treatment by the chambers 37 and longitudinal ducts 46. The fact that the invention is a surface treatment results in the reduction of the drag over a wide speed range. In tests performed at the Lockheed Ocean Laboratory in San Diego, Calif. on vehicles treated according to the structure of applicant's invention, a dramatic drag versus velocity improvement was realized. Overall drag improvements of approximately 14 percent have been demonstrated by such tests. In certain power limited applications, such as in sail boats and surfboards, a reduction in drag of 14 percent can result in an increase in top speed of as much as 50 percent or more.

As applied to water skis, as in the exemplary embodiment, applicants invention produces benefits which are representative of benefits obtained in the other potential applications for the surface treatment. Skis incorporating the surface treatment are easier to take off with and can be skied to a higher speed with the same boat and skier combination. At take-off, water will be filling the chambers 37 and 46 and the bore 40, however the relatively small volume of these chambers produces a quick evacuation of the chamber so that the skier rapidly obtains the benefits of air lubrication. As the ski reaches a relatively low speed, for example 10 miles per hour or more, the ventilated steps begin drawing sufficient air through the ventilation port 20, 22 and 24 which results in air lubrication of a portion of the ramps 28. For this portion of the ramps, the friction drag or viscous drag is reduced or eliminated and permits rapid acceleration to still higher speeds. At the typical speeds encountered in water ski operation, substantially all of the wetted underside of the ski is blanketed by a thin layer of air. In addition to reducing friction drag, this layer of air acts as a cushion so that the ski has a softer ride particularly in rough water. Additional cushioning is provided by the resiliency of the ramp portion 28 which may flex toward and away from the hull bottom surface 11. The normal suck down is reduced by alleviation of the usual negative pressure on the underside of any water borne surface. This makes it easier to jump the ski, because it is easier to lift the ski from the water surface. Similarly the ski is less effected when crossing wakes or other waves since there is less tendency for the nose portion to be sucked down and for the ski therefore to nose-dive, with the resultant forces on the user's legs and the possibility of a fall.

Having described my invention, I now claim:

1. A surface treatment for water borne vehicles having a hull structure with substantial water wetted surface area and wherein the improvement comprises:

a surface treatment applied to said hull structure over substantially all of the water wetted surfaces of said vehicle, said surface treatment comprising a plurality of air lubrication cells, there being a plurality of said cells across the beam wise width of said water wetted surface, and a plurality of said cells along the length wise dimension of said vehicle, said cells having a step portion extending substantially normal to said hull structure contour, a ramp surface extending from the innermost portion of one step, and angling away from said hull structure contour, said ramp surface being connected to the outermost extent of the adjacent step, and longitudinal channels extending lengthwise over substantially the entire water wetted surface of said vehicle along both sides of said cells, said step portion being penetrated by an air hole, said surface treatment being supported at least in part by contact between said hull structure and the innermost portions of said steps, a plurality of said air lubrication cells are above the nominal water line for said water borne vehicle, whereby at least a portion of said air drawn through said air holes in said air lubrication cells below the nominal water line is supplied by cells above the nominal water line.

2. A surface treatment for water borne vehicles according to claim 1 wherein:

said longitudinal channels comprise air channels providing pneumatic communication longitudinally of said hull structure between said air lubrication cells and through said holes and the air space between said ramp surface and said hull structure.

3. A surface treatment for water borne vehicles according to claim 1, wherein, said hull structure is penetrated by at least one ventilation duct for supplying air between said hull structure and said surface treatment.

4. A surface treatment for water borne vehicles according to claim 1, wherein, the outermost longitudinal channels constitute rails to increase the turning ability of said vehicle.

5. A surface treatment for water borne vehicles according to claim 1, wherein, a plurality of said step portions of said cells are staggered longitudinally from the corresponding step portions of adjacent longitudinal rows of cells.

6. A surface treatment for water borne vehicles according to claim 1, wherein, said ramp portions of said cells are substantially twice as long as they are wide.

7. A surface treatment for water borne vehicles according to claim 1, wherein, said ramp surface angling away from said hull structure contour at an angle not over substantialy 4°.

* * * * *